(12) United States Patent
Han et al.

(10) Patent No.: US 8,374,243 B2
(45) Date of Patent: Feb. 12, 2013

(54) METHOD AND APPARATUS FOR ENCODING AND DECODING BASED ON INTRA PREDICTION

(75) Inventors: Woo-jin Han, Suwon-si (KR); Yu-mi Sohn, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1226 days.

(21) Appl. No.: 12/016,554

(22) Filed: Jan. 18, 2008

(65) Prior Publication Data

US 2008/0175317 A1 Jul. 24, 2008

(30) Foreign Application Priority Data

Jan. 18, 2007 (KR) .................. 10-2007-0005805

(51) Int. Cl.
*H04N 7/12* (2006.01)
(52) U.S. Cl. ................ 375/240.13; 348/394.1
(58) Field of Classification Search .......... None
See application file for complete search history.

(56) References Cited

U.S. PATENT DOCUMENTS

| | | | | |
|---|---|---|---|---|
| 6,765,964 | B1 * | 7/2004 | Conklin | 375/240.14 |
| 7,843,995 | B2 * | 11/2010 | Bhaskaran et al. | 375/240.13 |
| 7,847,861 | B2 * | 12/2010 | Zhai et al. | 375/240.12 |
| 8,238,421 | B2 * | 8/2012 | Choi et al. | 375/240.13 |
| 2004/0233989 | A1 * | 11/2004 | Kobayashi et al. | 375/240.16 |
| 2006/0002466 | A1 | 1/2006 | Park | |
| 2006/0120456 | A1 | 6/2006 | Tasaka et al. | |
| 2006/0262216 | A1 | 11/2006 | Zhai et al. | |
| 2006/0262983 | A1 | 11/2006 | Cheng et al. | |
| 2007/0253484 | A1 * | 11/2007 | Zhao et al. | 375/240.13 |
| 2008/0089417 | A1 * | 4/2008 | Bao et al. | 375/240.16 |
| 2008/0123977 | A1 * | 5/2008 | Moriya et al. | 375/240.12 |
| 2008/0267291 | A1 * | 10/2008 | Vieron et al. | 375/240.16 |

FOREIGN PATENT DOCUMENTS

| | | |
|---|---|---|
| JP | 2000-270329 A | 9/2000 |
| JP | 2008-17305 A | 1/2008 |
| KR | 10-2006-0064509 A | 6/2006 |
| WO | 01/86962 A1 | 11/2001 |
| WO | 03/026315 A1 | 3/2003 |

OTHER PUBLICATIONS

Office Action, dated Oct. 2, 2012, issued by the Japanese Patent Office in counterpart Japanese Patent Application No. 2009-546313.

* cited by examiner

*Primary Examiner* — Jeffrey M Rutkowski
(74) *Attorney, Agent, or Firm* — Sughrue Mion, PLLC

(57) ABSTRACT

Methods and apparatuses for encoding and decoding based on intra prediction. The method of encoding an image based on intra prediction comprises dividing a current block into a plurality of sub blocks so that a plurality of unit blocks adjacent to each other are included in one of the sub blocks based on an intra prediction direction of each of the unit blocks included in the current block, and performing intra prediction encoding on each of the sub blocks so that only information about one intra prediction direction is encoded in each of the sub blocks.

25 Claims, 7 Drawing Sheets

METHOD AND APPARATUS FOR ENCODING AND DECODING BASED ON INTRA PREDICTION

CROSS-REFERENCE TO RELATED PATENT APPLICATION

This application claims priority from Korean Patent Application No. 10-2007-0005805, filed on Jan. 18, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to encoding and decoding based on intra prediction, and more particularly, to increasing a compression rate of intra prediction encoding by dividing a current block, that is to be encoded, into various forms of sub blocks and then intra prediction encoding the current block.

2. Description of the Related Art

In related art methods of compressing an image, such as MPEG-1, MPEG-2, and MPEG-4H.264/MPEG-4 Advanced Video Coding (AVC), a picture is divided into macro blocks in order to encode an image. Then, each macro block is encoded using inter prediction and intra prediction. Next, the macro blocks are encoded after selecting a suitable encoding mode by considering data size of the encoded macro block and distortion of the original macro block.

In intra prediction, a macro block of a current picture is encoded using pixel values spatially adjacent to the current block that is to be encoded, instead of using a reference picture. First, a prediction value of the current block that is to be encoded is calculated using the adjacent pixel values. Then, a difference between the prediction value and a pixel value of the original current block is encoded. The intra prediction modes can be largely divided into an intra prediction mode in luminance components and an intra prediction mode in chrominance components. The intra prediction mode in luminance components is divided into 4×4 intra prediction mode, 8×8 intra prediction mode, and 16×16 intra prediction mode.

FIGS. 1A through 1C illustrate block structures of related art intra prediction modes. FIG. 1A illustrates a unit block of a 16×16 intra prediction mode, FIG. 1B illustrates unit blocks of an 8×8 intra prediction mode, and FIG. 1C illustrates unit blocks of a 4×4 intra prediction mode.

A related art apparatus for encoding based on intra prediction performs intra prediction in 16×16, 8×8, and 4×4 intra prediction modes, and selects the optimum intra prediction mode from among the three intra prediction modes.

While performing intra prediction, an intra prediction direction of each unit block is determined, a prediction block is obtained according to the intra prediction direction, and then residue, in which the prediction block is subtracted from the original block, is encoded. The residue is discrete cosine transformed and then quantized in order to generate a bit stream. Information about the intra prediction direction of each unit block is inserted into the bit stream.

The optimum intra prediction mode is selected from the intra prediction modes illustrated in FIGS. 1A through 1C by considering residue and distortion. Criteria of the selection may differ according to types of data that is to be encoded and encoding apparatuses.

FIG. 2 illustrates in detail a related art 8×8 intra prediction mode.

In FIG. 2, a conventional apparatus for encoding based on intra prediction selects the 8×8 intra prediction mode illustrated in FIG. 1B for a current block, and determines an intra prediction direction of each unit block.

An intra prediction direction of two unit blocks 21 and 22 on the left is from top to bottom, and an intra prediction direction of two unit blocks 23 and 24 are from left to right.

Accordingly, when the apparatus intra prediction encodes the current block, information about the intra prediction directions of the four unit blocks 21 through 24 should be included.

Despite the fact that the intra prediction directions of the two unit blocks 21 and 22 on the left are equal and the intra prediction directions of the two unit blocks 23 and 24 on the right are equal, information about an intra prediction mode is repeatedly inserted in a bit stream because intra prediction encoding is performed based on an 8×8 block as a standard unit of intra prediction.

Accordingly, a method and apparatus for encoding based on intra prediction, which can increase a compression rate of intra prediction encoding by using a similarity between adjacent unit blocks, as illustrated in FIG. 2, are needed.

SUMMARY OF THE INVENTION

The present invention provides a method and apparatus for encoding based on intra prediction which can increase a compression rate of intra prediction encoding by using a similarity between adjacent unit blocks, and a computer readable recording medium having recorded thereon a program for executing the method.

According to an aspect of the present invention, there is provided a method of encoding an image based on intra prediction, the method including: dividing a current block into a plurality of sub blocks so that a plurality of unit blocks adjacent to each other are included in one sub block based on an intra prediction direction of each unit block included in the current block; and performing intra prediction encoding on each sub block so that only information about one intra prediction direction is encoded in each sub block, wherein the unit block is a block which is a standard unit of the intra prediction.

According to another aspect of the present invention, there is provided an apparatus for encoding an image based on intra prediction, the apparatus including: an area divider which divides a current block into a plurality of sub blocks so that a plurality of unit blocks adjacent to each other are included in one sub block based on an intra prediction direction of each unit block included in the current block; and an intra prediction performer which performs intra prediction encoding on each sub block so that only information about one intra prediction direction is encoded in each sub block, wherein the unit block is a block which is a standard unit of the intra prediction.

According to another aspect of the present invention, there is provided a method of decoding an image based on intra prediction, the method including: receiving a bit stream comprising data about a current block which is intra prediction encoded after being divided into a plurality of sub blocks so that a plurality of unit blocks adjacent to each other are included in one sub block based on an intra prediction direction of unit blocks included in the current block, and determining an intra prediction mode of the current block; and intra prediction decoding the data about the current block in a unit of the sub blocks according to the determined intra prediction mode, wherein the unit block is a block which is a standard unit of the intra prediction.

According to another aspect of the present invention, there is provided an apparatus for decoding an image based on intra prediction, the apparatus including: an intra prediction mode determiner which receives a bit stream comprising data about a current block which is intra prediction encoded after being divided into a plurality of sub blocks so that a plurality of unit blocks adjacent to each other are included in one sub block based on an intra prediction direction of unit blocks included in the current block, and determines an intra prediction mode of the current block; and an intra prediction performer which intra prediction decodes the data about the current block in a unit of the sub blocks according to the determined intra prediction mode, wherein the unit block is a block which is a standard unit of the intra prediction.

The sub blocks may include sub blocks having a plurality of sizes or rectangular sub blocks of equal size.

The sub blocks having a plurality of sizes may include rectangular sub blocks.

The sub blocks having a plurality of sizes may include square sub blocks.

According to another aspect of the present invention, there is provided a computer readable recording medium having recorded thereon a program for executing the method described above.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described more fully with reference to the accompanying drawings.

Figure 3:
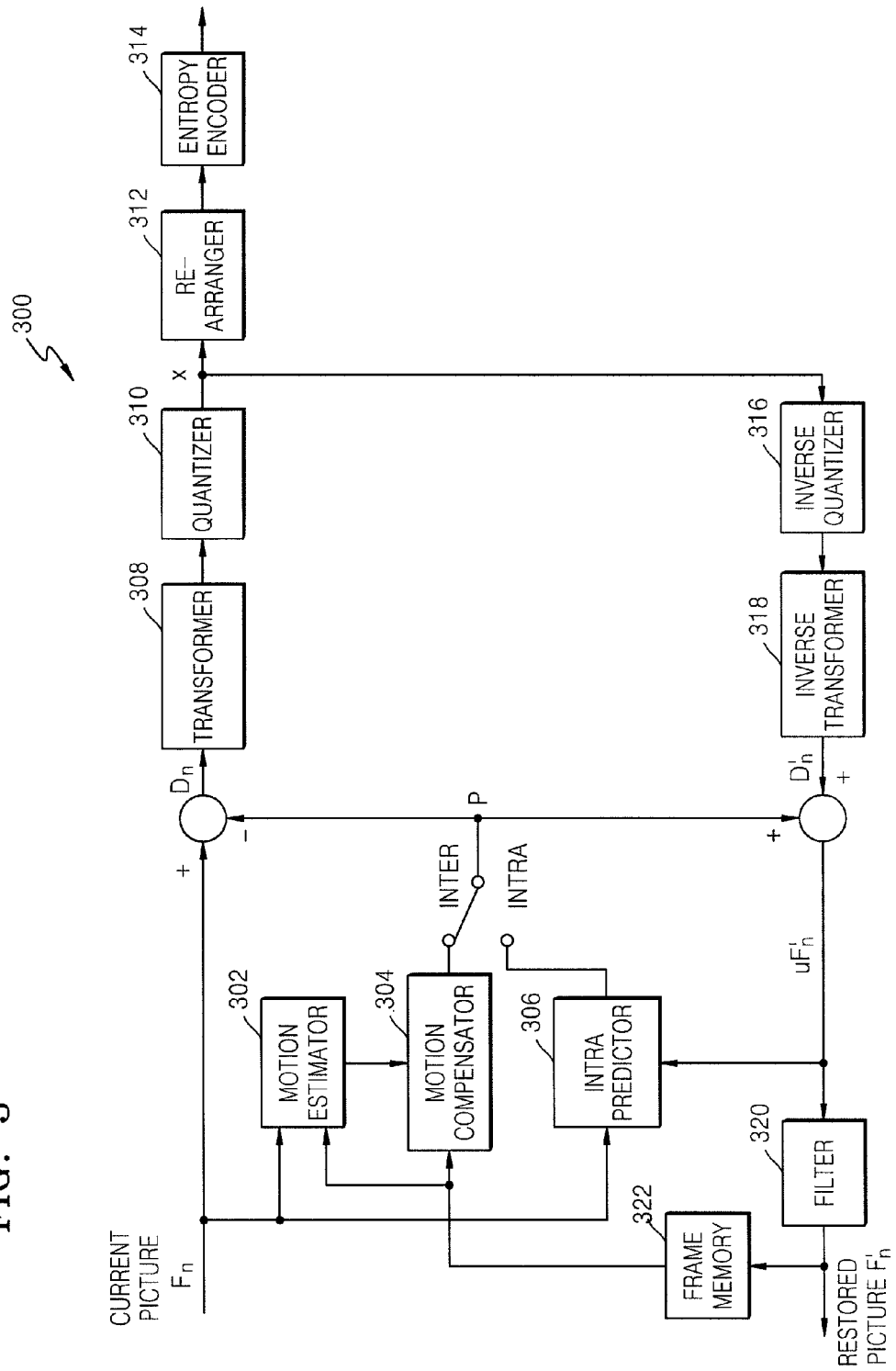
FIG. 3 illustrates a block diagram of an image encoding apparatus including an apparatus for encoding based on intra prediction according to an exemplary embodiment of the present invention.

FIG. 3 illustrates a block diagram of an image encoding apparatus 300 including an apparatus for encoding based on intra prediction according to an exemplary embodiment of the present invention. Hereinafter, the apparatus for encoding based on intra prediction according to the current embodiment is applied to an image encoding apparatus according to the H.264 standard. However, one of ordinary skill in the art can easily understand that the apparatus for encoding based on intra prediction can be applied to an image encoding apparatus using other intra prediction modes.

The image encoding apparatus 300 includes a motion estimator 302, a motion compensator 304, an intra predictor 306, a transformer 308, a quantizer 310, a re-arranger 312, an entropy encoder 314, an inverse quantizer 316, an inverse transformer 318, a filter 320, and a frame memory 322. The intra predictor 306 corresponds to the apparatus for encoding based on intra prediction according to the current embodiment.

The motion estimator 302 and the motion compensator 304 perform inter prediction in which a prediction value of a macro block of a current picture is searched for in a reference picture.

Figure 1A:
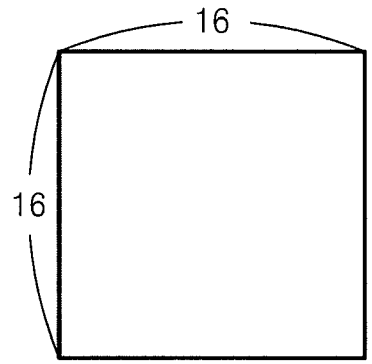
FIGS. 1A, 1B, and 1C illustrate block structures of related art intra prediction modes.
Figure 1B:
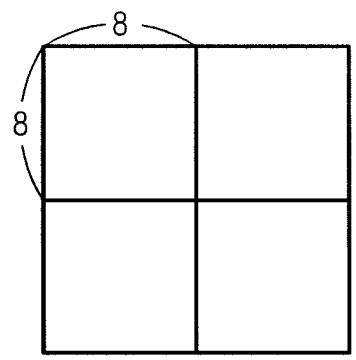
Figure 1C:
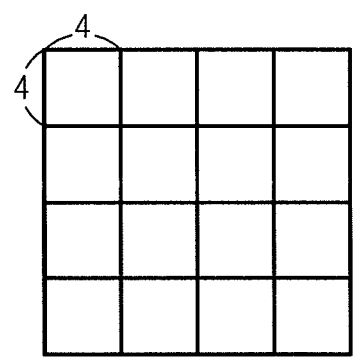

The intra predictor 306 performs intra prediction in which a prediction value of a current block is searched for in the current picture. Specifically, the intra predictor 306 receives the current block that is to be prediction encoded and performs intra prediction encoding on the current block in the 16×16 intra prediction mode, 8×8 intra prediction mode, or 4×4 intra prediction mode described above with reference to FIG. 1. Also, besides conventional intra prediction modes, new intra prediction modes, which can perform intra prediction by dividing the current block into sub blocks having a plurality of sizes or rectangular sub blocks of equal size, are provided. The new intra prediction modes will be described with reference to FIG. 4.

Figure 4:
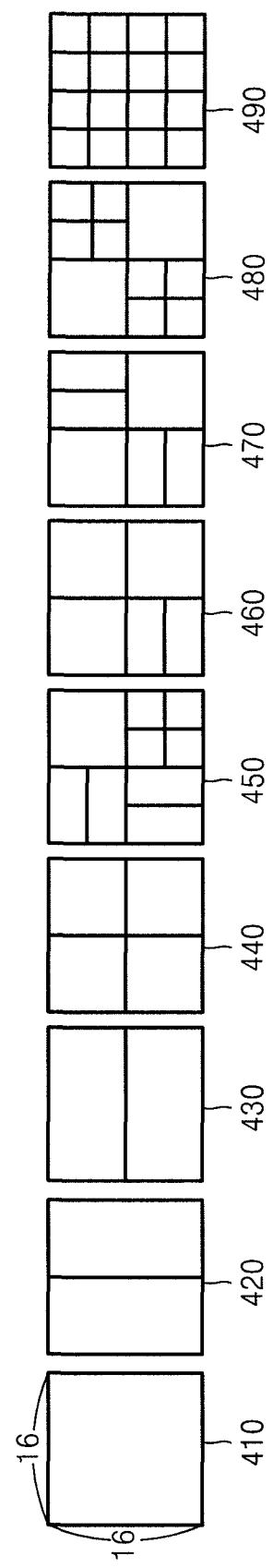
FIG. 4 illustrates intra prediction modes according to exemplary embodiments of the present invention.

FIG. 4 illustrates intra prediction modes according to exemplary embodiments of the present invention.

As well as related art1 intra prediction modes, the intra predictor 306 can provide intra prediction modes, in which intra prediction is performed by dividing a current block into sub blocks having various sizes.

The intra predictor 306 provides an intra prediction mode, in which the current block is divided into sub blocks and then encoded so that a plurality of unit blocks adjacent to each other are included in one sub block based on an intra prediction direction of the unit blocks included in the current block. The current block is a 16×16 macro block, and a unit block, which is a standard unit in an intra prediction, is an 8×8 or 4×4 block.

Figure 2:
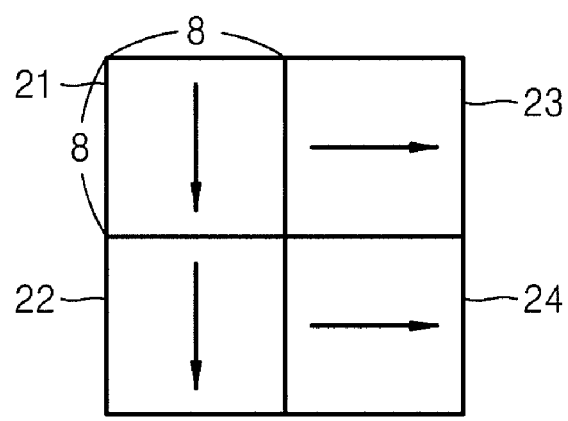
FIG. 2 illustrates in detail a related art 8×8 intra prediction mode.

Referring to FIG. 2, an intra prediction mode in which the unit blocks 21 and 22 on the left are bound as one sub block since the intra prediction directions of the unit blocks 21 and 22 are equal, and the unit blocks 23 and 24 on the right are bound as one sub block since the intra prediction directions of the unit blocks 23 and 24 are equal.

However, only the unit blocks that have the same intra prediction direction, are not set as one sub block, as illustrated in FIG. 2. Even when the intra prediction directions are not the same, unit blocks can be set as one sub block considering residue and distortion. For example, the unit blocks on the left 21 and 22 can be set as one sub block even when the intra prediction direction of the unit block 22 is diagonal from top right to bottom left, if the entire number of bits of the current blocks 21, 22, 23, and 24 can be reduced.

The intra prediction modes illustrated in FIG. 4 are the exemplary embodiments of intra prediction according to the present invention, and one of ordinary skill in the art can easily understand that other intra prediction modes can be used.

A 16×16 intra prediction mode 410, an 8×8 intra prediction mode 440, and a 4×4 intra prediction mode 490 are conventional intra prediction modes.

Besides the conventional intra prediction modes, the intra predictor 306 provides intra prediction modes, in which an intra prediction is performed on the current block by dividing the current block into rectangular sub blocks of equal size. The current block is divided into a plurality of sub blocks so that unit blocks having the same or a similar intra prediction direction are included in one sub block by referring to intra prediction directions of unit blocks included in the current block.

An intra prediction mode 420 in which intra prediction is performed on the current block by dividing the current block into two rectangular sub blocks having an 8×16 size, and an intra prediction mode 430 in which an intra prediction is performed on the current block by dividing the current block into two rectangular sub blocks having a 16×8 size are the intra prediction modes which performs intra prediction by dividing the current block into rectangular sub blocks of equal size.

In the exemplary embodiment described with reference to FIG. 2, despite the fact that the intra prediction directions of the unit blocks 21 and 22 on the left are the same and the intra prediction directions of the unit blocks 23 and 24 on the right are the same, information about an intra prediction mode is repeatedly inserted into a bit stream because intra prediction encoding is performed based on an 8×8 block as a standard block. However, by using the 8×16 intra prediction mode 420, the unit blocks 21 and 22 on the left and the unit blocks 23 and 24 on the right are respectively bound as 8×16 sub blocks in order to perform intra prediction. Accordingly, information about an intra prediction mode is encoded only once and then inserted into a bit stream.

Sub blocks in 8×16 and 16×8 sizes are examples of rectangular sub blocks, and rectangular sub blocks having various sizes, such as 4×8, 8×4, etc. can be used in dividing the current block in order to perform intra prediction encoding, when the current block is divided into rectangular sub blocks of equal size.

Also, the intra predictor 306 provides intra prediction modes in which intra prediction is performed by dividing the current block into sub blocks having a plurality of sizes. The sub blocks having a plurality of sizes include rectangular sub blocks and/or square sub blocks.

Referring to FIG. 4, intra prediction modes 450, 460, and 470 include both rectangular sub blocks and square sub blocks. The rectangular sub blocks may include at least one of sub blocks in 8×16, 16×8, 8×4, and 4×8 sizes, and the square sub blocks may include at least one of sub blocks in 8×8 and 4×4 sizes.

The intra predictor 306 also provides an intra prediction mode 480 in which intra prediction is performed by dividing the current block into square sub blocks having a plurality of sizes. Related art intra prediction modes 410, 440, and 490 perform intra prediction by dividing the current block into unit blocks of equal size. However, using the intra prediction mode 480, intra prediction can be performed by dividing the current block into 8×8 and 4×4 sub blocks.

Figure 5:
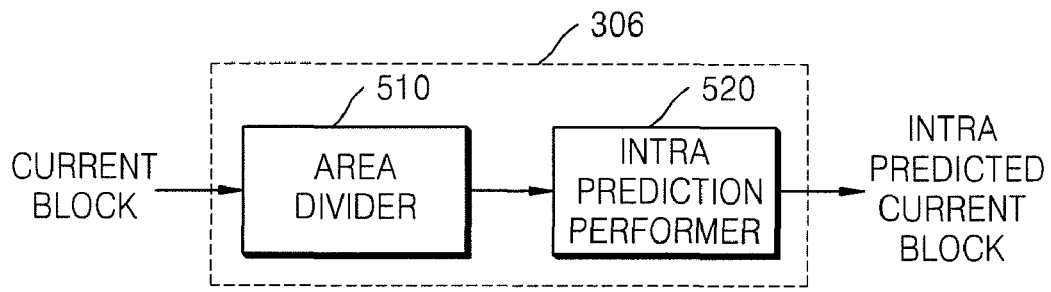
FIG. 5 illustrates a block diagram of an apparatus for encoding based on intra prediction according to an exemplary embodiment of the present invention.

FIG. 5 illustrates a block diagram of an apparatus for encoding based on intra prediction according to an exemplary embodiment of the present invention.

The apparatus according to the current embodiment includes an area divider 510 and an intra prediction performer 520.

The area divider 510 divides the current block, which is to be intra prediction encoded and included in a current picture Fn, into a plurality of sub blocks. The current block can be divided into sub blocks as illustrated in FIG. 4.

Accordingly, the current block is divided into a plurality of sub blocks so that a plurality of unit blocks adjacent to each other are included in one sub block based on intra prediction directions of the unit blocks included in the current block. Preferably, the current block is divided into sub blocks having a plurality of sizes or rectangular sub blocks of equal size.

The sub blocks having a plurality of sizes include rectangular sub blocks and/or square sub blocks. The rectangular sub blocks may include at least one of sub blocks in 8×16, 16×8, 8×4, and 4×8 sizes, and square sub blocks may include at least one of sub blocks in 8×8 and 4×4 sizes.

When the current block is divided into the rectangular sub blocks of equal size, one of the sub blocks in 8×16, 16×8, 8×4, and 4×8 sizes can be used.

When the intra prediction performer 520 performs intra prediction encoding on the current block divided into the plurality of sub blocks by the area divider 510, the intra prediction encoding is performed in each unit of sub blocks so that only information about one intra prediction direction is encoded in each sub block. The intra prediction encoding is performed on each of the rectangular and/or square sub blocks.

Referring back to FIG. 3, a prediction block, which is generated by the intra predictor 306 performing intra prediction on the current block, is differentiated from the original current block in order to generate residue. From among various intra prediction modes performed in the intra predictor 306, the optimum intra prediction mode is selected considering residue and distortion in order to generate the prediction block and then the prediction block is differentiated from the original current block.

The generated residue is transformed to a frequency domain by the transformer 308 and quantized in the quantizer 310. The entropy encoder 314 encodes the quantized residue and outputs a bit stream.

The information about an intra prediction mode is inserted into the bit stream. According to exemplary embodiments of the present invention, intra prediction encoding is performed by binding similar adjacent blocks together, since the information about intra prediction directions are identical or similar. Accordingly, the information about an intra prediction mode does not need to be repeatedly inserted into the bit stream.

Figure 6:
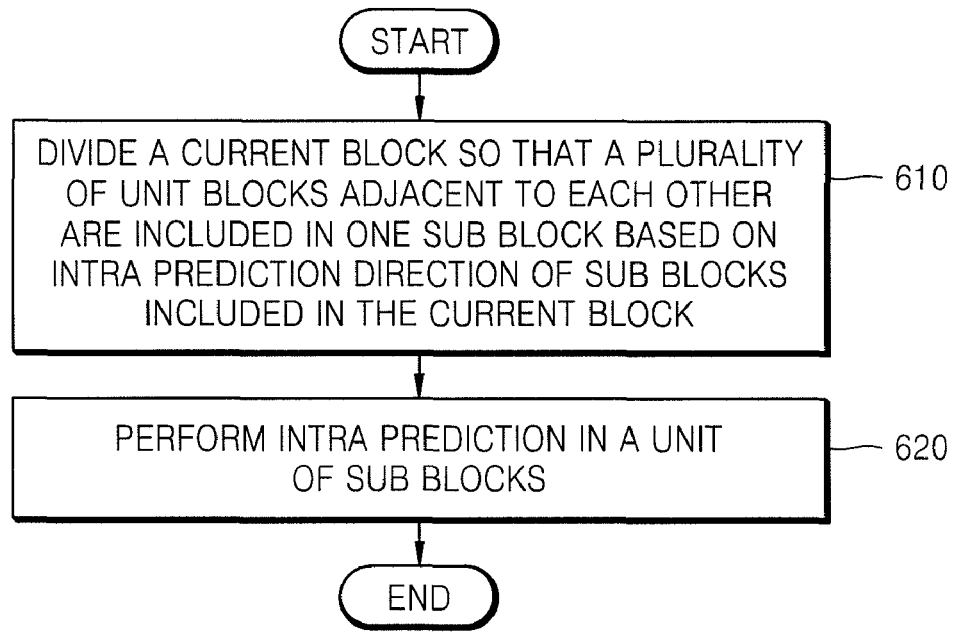
FIG. 6 is a flowchart illustrating a method of encoding based on intra prediction according to an exemplary embodiment of the present invention.

FIG. 6 is a flowchart illustrating a method of encoding based on intra prediction according to an exemplary embodiment of the present invention.

In operation 610, an apparatus for encoding based on intra prediction according to an exemplary embodiment of the present invention divides a current block into a plurality of sub blocks so that a plurality of unit blocks adjacent to each other is included in one sub block based on intra prediction directions of the unit blocks included in the current block. The apparatus not only divides the current block into square sub blocks having the same size like conventional technology, but also divides the current block into sub blocks having a plurality of sizes or rectangular sub blocks of equal size.

The sub blocks having a plurality of sizes can simultaneously include rectangular sub blocks and/or square sub blocks.

In operation 620, the apparatus performs intra prediction encoding on the current block divided into the plurality of sub blocks in operation 610 in a unit of sub blocks so that information about one intra prediction direction is encoded in each sub block.

Figure 7:
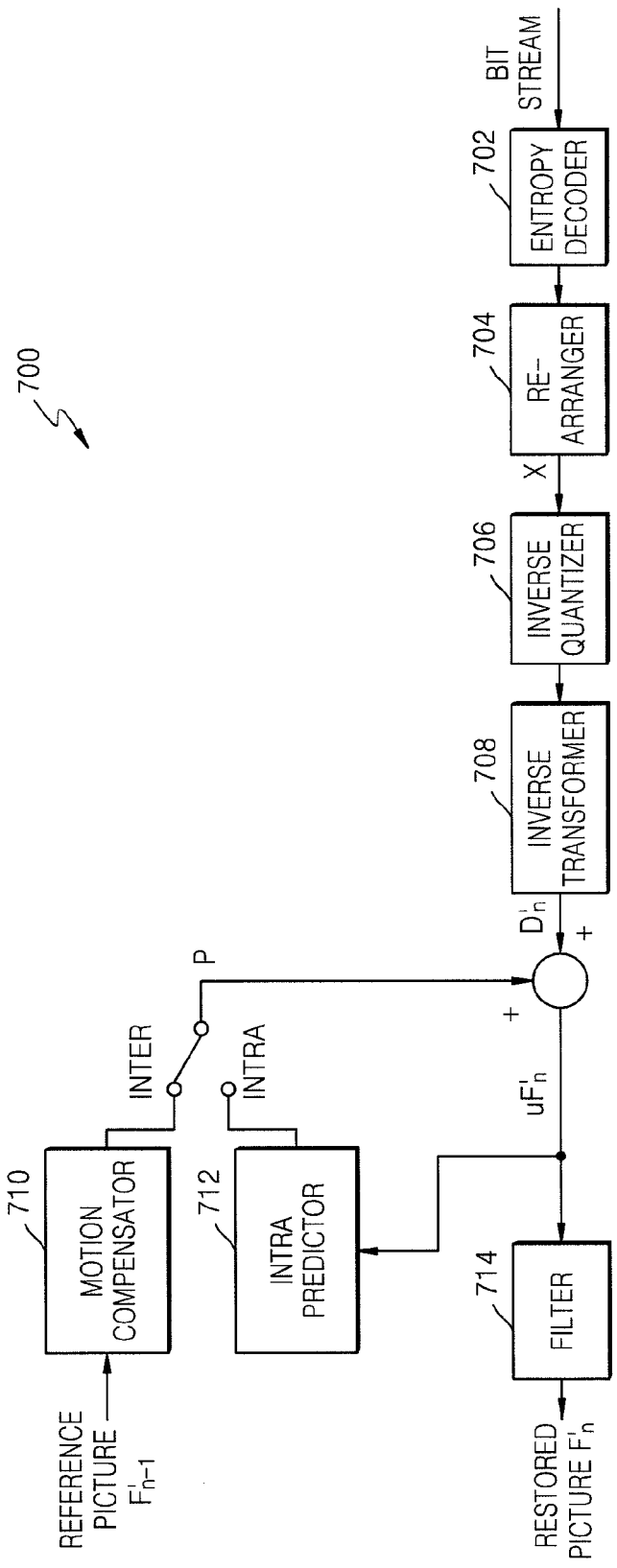
FIG. 7 illustrates a block diagram of an image decoding apparatus including an apparatus for decoding based on intra prediction according to an exemplary embodiment of the present invention.

FIG. 7 illustrates a block diagram of an image decoding apparatus 700 including an apparatus for decoding based on intra prediction according to an exemplary embodiment of the present invention.

The image decoding apparatus 700 includes an entropy decoder 702, a re-arranger 704, an inverse quantizer 706, an inverse transformer 708, a motion compensator 710, an intra predictor 712, and a filter 714. The intra predictor 712 corresponds to the apparatus for decoding based on intra prediction according to the current exemplary embodiment.

The entropy decoder 702 and the re-arranger 704 receive a bit stream and perform entropy decoding in order to generate a quantized coefficient. The inverse quantizer 706 and the transformer 708 perform inverse quantization and inverse transform on the quantized coefficient in order to extract transform encoded coefficients, information about a motion vector, information about a header, information about an intra prediction mode, etc. The information about an intra prediction mode includes information about a method of encoding based on intra prediction used in encoding the current block. For example, the information about an intra prediction mode may include information about one intra prediction mode used from among the intra prediction modes from the embodiments illustrated in FIG. 4.

The motion compensator 710 and the intra predictor 712 generate a prediction block by referring to decoded information about a header, and the generated prediction block is added to D'n, which indicates residue, in order to generate uF'n. The uF'n becomes a restored picture F'n by passing through the filter 714. The intra predictor 712 corresponds to the apparatus for decoding based on intra prediction according to the current embodiment.

Specifically, the intra predictor 712 determines an intra prediction mode used in encoding the current block by referring to the information about an intra prediction mode included in the received bit stream, and intra prediction decodes data about the current block in a unit of sub blocks according to the determined intra prediction mode.

Figure 8:
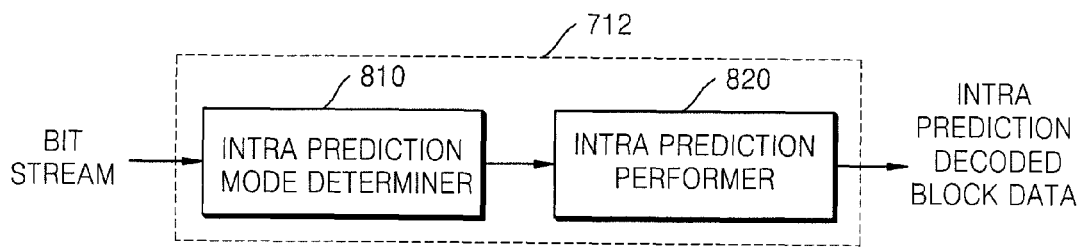
FIG. 8 illustrates a block diagram of an apparatus for decoding based on intra prediction according to an exemplary embodiment of the present invention.

FIG. 8 illustrates a block diagram of an apparatus for decoding based on intra prediction according to an exemplary embodiment of the present invention.

The apparatus includes an intra prediction mode determiner 810 and an intra prediction performer 820.

The intra prediction mode determiner 810 receives a bit stream including data about the current block, which is divided into a plurality of sub blocks so that a plurality of unit blocks adjacent to each other are included in one sub block based on intra prediction directions of the unit blocks included in the current block and are then intra prediction encoded, and determines an intra prediction mode of the current block.

In the method of encoding based on intra prediction according to the previous embodiment, the current block is intra prediction encoded by dividing the current block into a plurality of sub blocks as illustrated in FIG. 4. Accordingly, the intra prediction mode determiner 810 receives the intra prediction encoded bit stream using the method illustrated in FIG. 4 and determines an intra prediction mode from the examples illustrated in FIG. 4 by referring to the information about an intra prediction mode included in the bit stream.

A method of performing intra prediction is determined based on how the current block is divided into a plurality of sub blocks and then encoded.

The intra prediction performer 820 intra prediction decodes the data about the current block included in the bit stream based on the intra prediction mode determined by the intra prediction mode determiner 810.

The data about the current block is decoded by performing intra prediction decoding on the current block, which is divided into a plurality of sub blocks, in a unit of sub blocks according to the information about an intra prediction mode.

Figure 9:
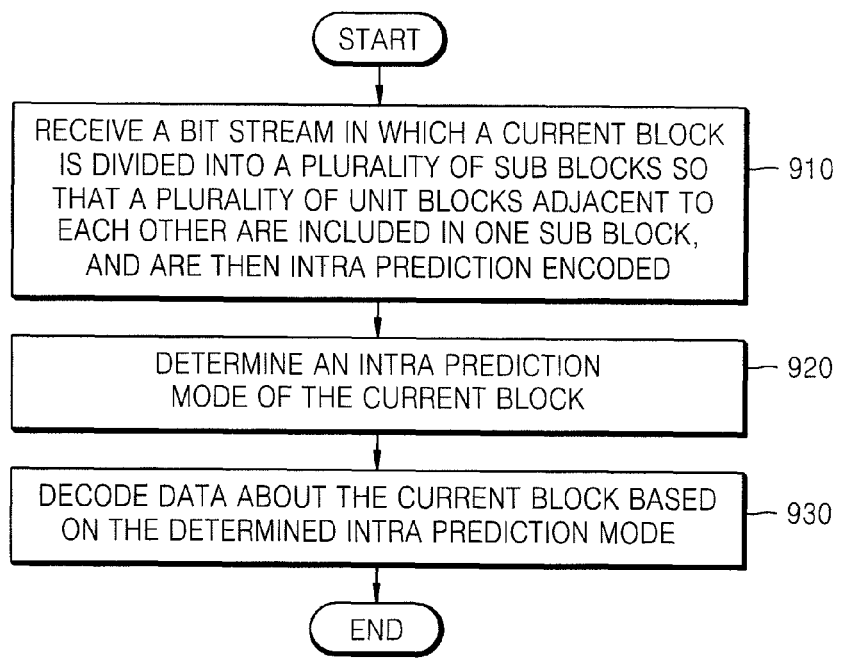
FIG. 9 is a flowchart illustrating a method of decoding based on intra prediction according to an exemplary embodiment of the present invention.

FIG. 9 is a flowchart illustrating a method of decoding based on intra prediction according to an exemplary embodiment of the present invention.

In operation 910, an apparatus for decoding based on intra prediction according to an exemplary embodiment of the present invention receives a bit stream including data about a current block which is divided into a plurality of sub blocks so that a plurality of unit blocks adjacent to each other is included in one sub block based on intra prediction directions of unit blocks included in the current block and then intra prediction encoded.

Preferably, but not necessarily, the apparatus receives the bit stream in which the current block is divided into sub blocks having a plurality of sizes or rectangular sub blocks of equal size and then intra prediction encoded.

In operation 920, the apparatus determines an intra prediction mode of the current block by referring to information about an intra prediction mode of the current block included in the bit stream received in operation 910.

A method of performing intra prediction is determined based on how the current block is divided into a plurality of sub blocks and then encoded referring to the information about an intra prediction mode.

In operation 930, the apparatus performs intra prediction decoding on the current block based on the intra prediction mode determined in operation 920. The intra prediction decoding is performed on the current block, which is divided into a plurality of sub blocks according to the intra prediction mode determined in operation 920, in a unit of sub blocks.

The present invention can also be embodied as computer readable codes on a computer readable recording medium. The computer readable recording medium is any data storage device that can store data which can be thereafter read by a computer system. Examples of the computer readable recording medium include but are not limited to: read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

According to the exemplary embodiments of the present invention, information about an intra prediction mode does not need to be repeatedly transmitted by binding adjacent sub blocks having a similarity to each other, such as the same intra prediction direction, to one sub block while performing intra prediction encoding. Accordingly, a compression rate of intra prediction encoding can increase.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of encoding an image based on intra prediction, the method comprising:
   determining an intra prediction direction of each unit block included in a current block;
   dividing the current block into a plurality of sub blocks so that a plurality of unit blocks adjacent to each other are included in one of the sub blocks based on the intra prediction direction of each of the unit blocks included in the current block; and performing intra prediction encoding on each of the sub blocks so that only one intra prediction direction is encoded in each of the sub blocks, wherein unit blocks having equal intra prediction directions are bound as one sub block.

2. The method of claim 1, wherein the sub blocks comprise sub blocks having a plurality of sizes or rectangular sub blocks of equal size.

3. The method of claim 2, wherein the sub blocks having a plurality of sizes comprise rectangular sub blocks.

4. The method of claim 2, wherein the rectangular sub blocks comprise at least one of blocks in 16×8, 8×16, 8×4, and 4×8 sizes.

5. The method of claim 2, wherein the sub blocks having a plurality of sizes comprise square sub blocks.

6. The method of claim 5, wherein the square sub blocks comprise at least one of blocks in 8×8 and 4×4 sizes.

7. The method of claim 2, wherein the rectangular sub blocks comprise at least one of blocks in 16×8, 8×16, 8×4, and 4×8 sizes.

8. An apparatus for encoding an image based on intra prediction, the apparatus comprising:

an area divider which determines an intra prediction direction of each unit block included in a current block and divides the current block into a plurality of sub blocks so that a plurality of unit blocks adjacent to each other are included in one of the sub blocks based on the intra prediction direction of each of the unit blocks included in the current block; and an intra prediction performer which performs intra prediction encoding on each of the sub blocks so that only one intra prediction direction is encoded in each of the sub blocks, wherein unit blocks having equal intra prediction directions are bound as one sub block.

9. The apparatus of claim 8, wherein the sub blocks comprise sub blocks having a plurality of sizes or rectangular sub blocks in one size.

10. The apparatus of claim 9, wherein the sub blocks having a plurality of sizes comprise rectangular sub blocks.

11. The apparatus of claim 10, wherein the rectangular sub blocks comprise at least one of blocks in 16×8, 8×16, 8×4, and 4×8 sizes.

12. The apparatus of claim 9, wherein the sub blocks having a plurality of sizes comprise square sub blocks.

13. The apparatus of claim 12, wherein the square sub blocks comprise at least one of blocks in 8×8 and 4×4 sizes.

14. The apparatus of claim 9, wherein the rectangular sub blocks comprise at least one of blocks in 16×8, 8×16, 8×4, and 4×8 sizes.

15. A method of decoding an image based on intra prediction, the method comprising:

receiving a bit stream comprising data about a current block which is intra prediction encoded after determining an intra prediction direction of each unit block included in the current block and being divided into a plurality of sub blocks so that a plurality of unit blocks adjacent to each other are included in one of the sub blocks based on the intra prediction direction of the unit blocks included in the current block, and determining an intra prediction mode of the current block by referring to one intra prediction direction decoded from each of the plurality of sub blocks; and intra prediction decoding the data about the current block in a unit of the sub blocks according to the determined intra prediction mode, wherein unit blocks having equal a prediction directions are bound s one sub block.

16. The method of claim 15, wherein the sub blocks comprise sub blocks having a plurality of sizes or rectangular sub blocks of equal size.

17. The method of claim 16, wherein the sub blocks having a plurality of sizes comprise rectangular sub blocks.

18. The method of claim 16, wherein the sub blocks having a plurality of sizes comprise square sub blocks.

19. The method of claim 16, wherein the rectangular sub blocks comprise at least one of blocks in 16×8, 8×16, 8×4, and 4×8 sizes.

20. An apparatus for decoding an image based on intra prediction, the apparatus comprising:

an intra prediction mode determiner which receives a bit stream comprising data about a current block which is intra prediction encoded after determining an intra prediction direction of each unit block included in the current block and being divided into a plurality of sub blocks so that a plurality of unit blocks adjacent to each other are included in one of the sub blocks based on the intra prediction direction of the unit blocks included in the current block, and determines an intra prediction mode of the current block by referring to one intra prediction direction decoded from each of the plurality of sub blocks; and an intra prediction performer which intra prediction decodes the data about the current block in a unit of the sub blocks according to the determined intra prediction mode, wherein unit blocks having equal intra prediction directions are bound as one sub block.

21. The apparatus of claim 20, wherein the sub blocks comprise sub blocks having a plurality of sizes or rectangular sub blocks of equal size.

22. The apparatus of claim 20, wherein the sub blocks having a plurality of sizes comprise rectangular sub blocks.

23. The apparatus of claim 21, wherein the sub blocks having a plurality of sizes comprise square sub blocks.

24. The apparatus of claim 21, wherein the rectangular sub blocks comprise at least one of blocks in 16×8, 8×16, 8×4, and 4×8 sizes.

25. A non-transitory computer readable recording medium having recorded thereon a program for executing the method of claim 15.

* * * * *